United States Patent [19]
Ishii

[11] Patent Number: 5,523,986
[45] Date of Patent: Jun. 4, 1996

[54] MAGNETIC HEAD FOR MAGNETOOPTICAL RECORDING AND METHOD FOR PRODUCING THE SAME

[75] Inventor: Kazuyoshi Ishii, Tokyo, Japan

[73] Assignee: Canon Kabushiki Kaisha, Tokyo, Japan

[21] Appl. No.: 517,653

[22] Filed: Aug. 22, 1995

Related U.S. Application Data

[63] Continuation of Ser. No. 102,792, Aug. 6, 1993, abandoned.

[30]  Foreign Application Priority Data

Aug. 28, 1992 [JP] Japan .................................. 4-251863
Feb. 26, 1993 [JP] Japan .................................. 5-061318

[51] Int. Cl.$^6$ ..................................................... G11B 11/00
[52] U.S. Cl. ............................. 369/13; 360/114; 360/103
[58] Field of Search ........................... 369/13, 14; 360/59, 360/114, 103, 104, 109, 119, 120, 123

[56]  References Cited

U.S. PATENT DOCUMENTS

| | | | |
|---|---|---|---|
| 5,233,492 | 8/1993 | Iwata et al. | 360/120 |
| 5,260,845 | 11/1993 | Takayama et al. | 360/103 |
| 5,270,888 | 12/1993 | Collisson et al. | 360/103 |

*Primary Examiner*—Georgia Y. Epps
*Assistant Examiner*—Tan Dinh
*Attorney, Agent, or Firm*—Fitzpatrick, Cella, Harper & Scinto

[57]  ABSTRACT

A magnetic head for magnetooptical recording includes a substrate, a magnetic core provided on the substrate, a coil wound on the magnetic core, and a drive device for driving the coil. Further, a reinforcing member is provided around the coil so that the substrate is reinforced. The reinforcing member contains thermosetting resinous material. The thermal expansion coefficient of the reinforcing member is selected to be substantially equal to that of the substrate.

8 Claims, 5 Drawing Sheets

FIG. 6E of prior application, application Ser. No. 08/102,792, filed Aug. 6, 1993, now abandoned.

MAGNETIC HEAD FOR MAGNETOOPTICAL RECORDING AND METHOD FOR PRODUCING THE SAME

This application is a continuation of prior application, application Ser. No. 08/102,792, filed Aug. 6, 1993, now abandoned.

BACKGROUND OF THE INVENTION

1. Field of the Invention

The present invention relates to a magnetic head adapted for use in magnetooptical recording using a magnetic field modulation method.

2. Related Background Art

Figure 1:
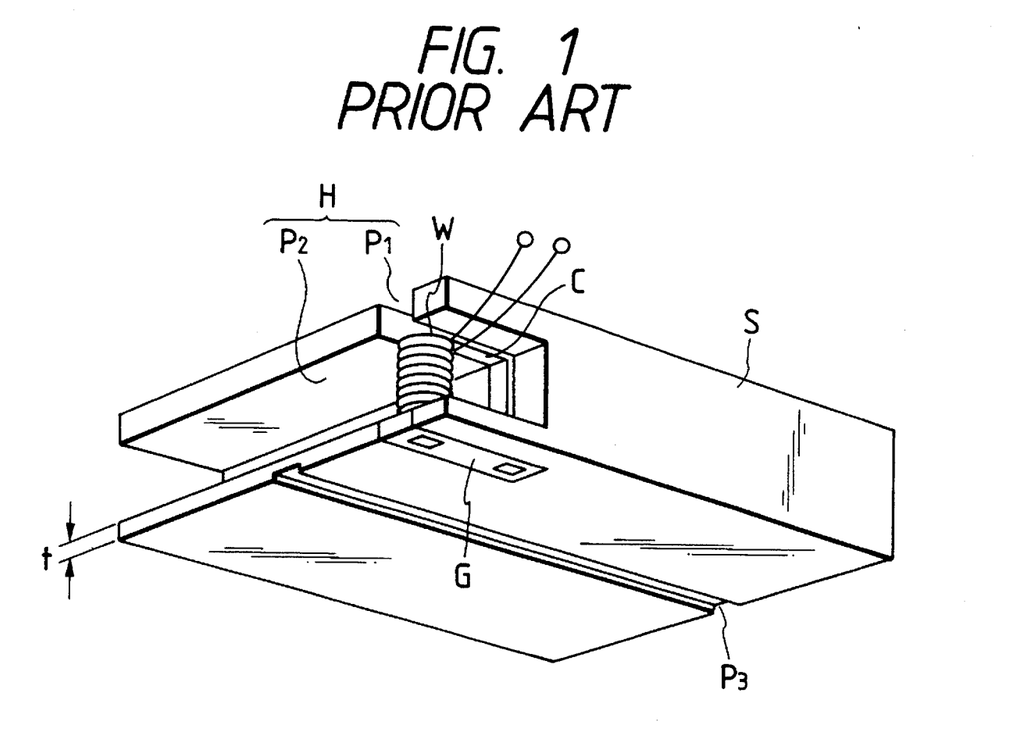
FIG. 1 is a perspective view of a conventional magnetic head for magnetooptical recording.

FIG. 1 illustrates an already known magnetic head, for magnetooptical signal recording using a magnetic field modulation method on a magnetooptical recording medium formed as a disk. A slider S, composed of a non-magnetic material such as ceramics, has an aerodynamic floating surface in order to maintain the magnetic head in a floating state with a small distance to the disk, by an air flow generated by high speed rotation of the disk. At the rear end of said slider S, there is provided a housing H, for accommodating a magnetic core C composed of a magnetic material such as ferrite. The housing H is composed of a groove P1 for housing the magnetic core, and a groove P2 for a coil winding. The magnetic core C is arranged in the groove P1, and adhered by fused glass G. A coil W is wound on a main magnetic pole of the magnetic core C. A groove P3 is provided on the bottom face, in order to improve the air floating characteristics of the slider S. The coil W is connected to unrepresented driving means.

Such a magnetic head for magnetooptical recording is being recently required to be adapted to high speed signal recording, and, in order to meet such a requirement, it becomes necessary to reduce the inductance of the magnetic head and to improve the efficiency of the magnetic field generation. As an effective method for attaining these objectives, it has been tried to position the coil W closer to the magnetic pole end of the magnetic core C, namely closer to the disk.

For this reason, there has recently been adapted a structure in which the thickness t of the lower protruding portion of the housing H in the slider S is made smaller whereby the coil W is positioned closer to the magnetic pole end of the magnetic core C. However, if the thickness t is made about 0.2 mm or smaller, the lower protruding portion of the housing H becomes mechanically weak and may be damaged by the shock caused by the instantaneous contact of the slider S with the disk, at the loading, unloading or seeking operation of the slider S.

SUMMARY OF THE INVENTION

In order to overcome the above-mentioned drawback in the prior art, the present invention is featured by a reinforcing member of a non-magnetic material being provided inside the coil winding groove in the housing portion of the slider.

The reinforcing member can be composed of a thermosetting resinous material, and an enhanced effect can be attained with such a thermosetting resinous material of which hardness is increased by mixing an inorganic filler.

Also the reinforcing member can be composed of a spacer of a material of which the thermal expansion coefficient is close to that of the non-magnetic material constituting the slider, such as glass or ceramics.

DETAILED DESCRIPTION OF THE PREFERRED EMBODIMENTS

Now the magnetic head for magnetooptical recording of the present invention will be clarified in detail by the preferred embodiments, with reference to the attached drawings, wherein components the same as those in the conventional configuration shown in FIG. 1 are represented by the same symbols and the structure and function of such components will be omitted from the following description.

Figure 2:
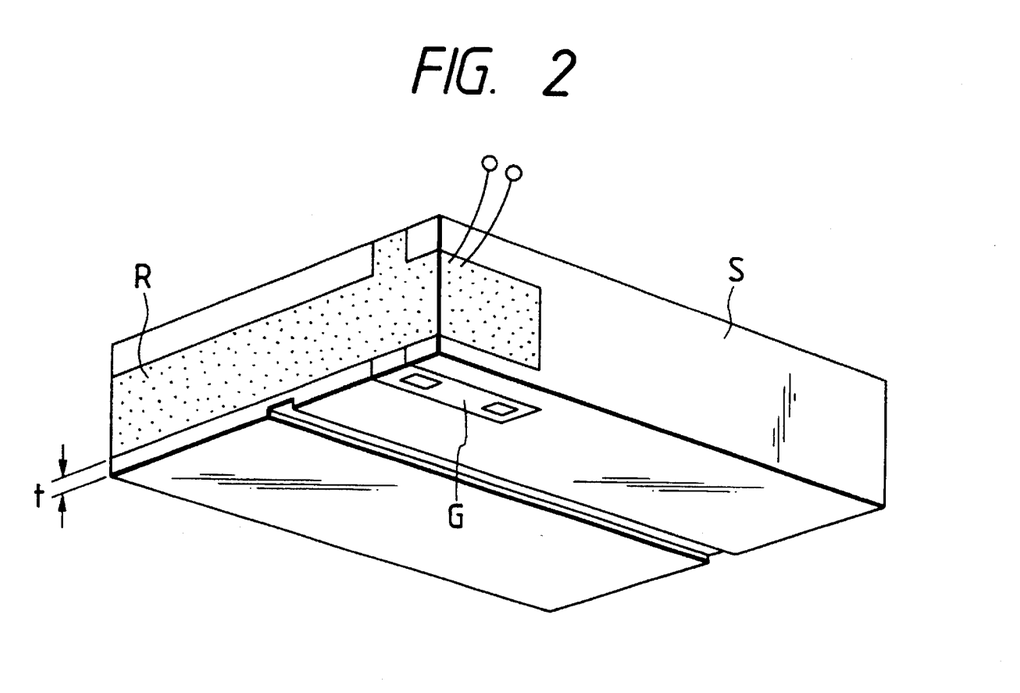
FIG. 2 is a perspective view of a magnetic head for magnetooptical recording, constituting a first embodiment of the present invention.

FIG. 2 illustrates a first embodiment of the magnetic head for magnetooptical recording of the present invention, wherein a reinforcing member R provided in the coil winding groove, is composed of thermosetting resin such as epoxy resin. In this embodiment, the reinforcing member is fixed to the slider by thermal setting after the epoxy resin is filled in the coil winding groove. The mechanical strength of the reinforcing member can be increased by mixing inorganic filler, such as glass or alumina, into the epoxy resin. Such a reinforcing member R provided around the coil W increases the mechanical strength of the housing portion H of the slider S.

Figure 3A:
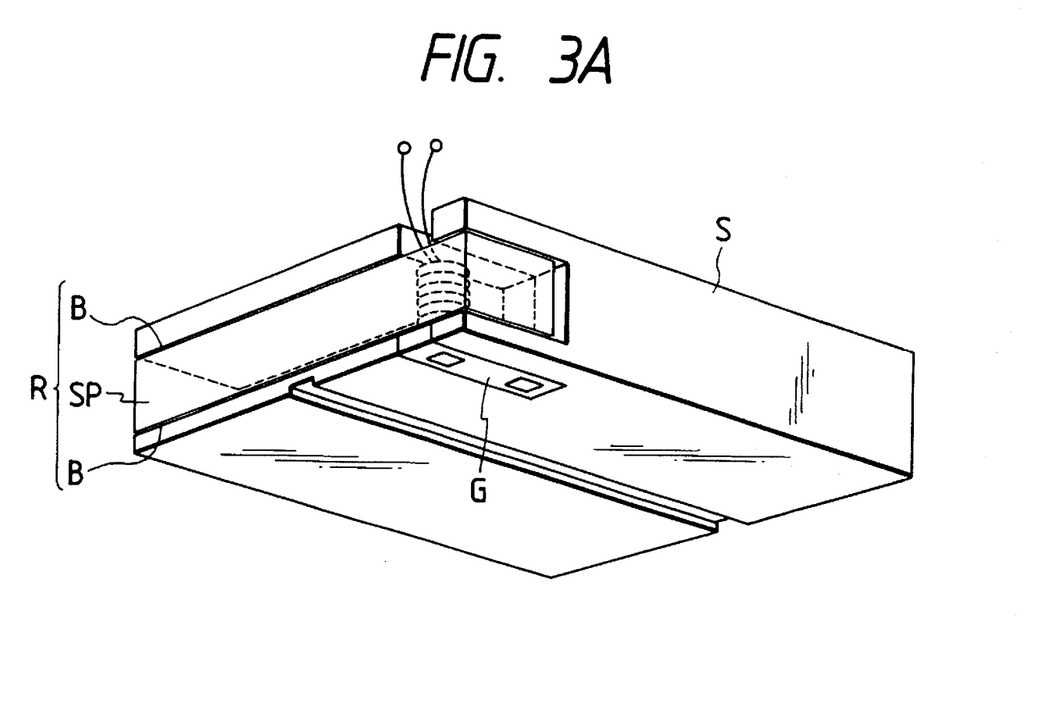
FIG. 3A is a perspective view of a magnetic head for magnetooptical recording, constituting a second embodiment of the present invention.
Figure 3B:
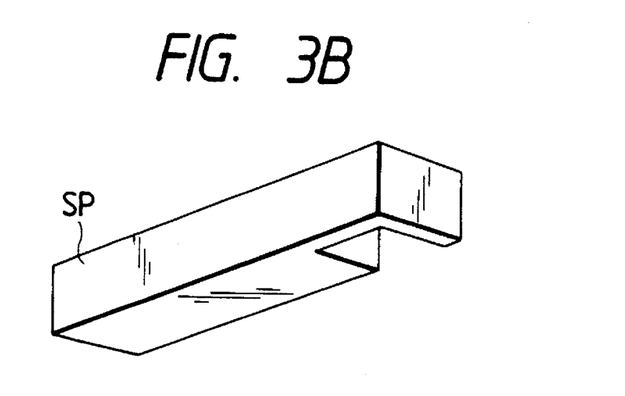
FIG. 3B is a perspective view of a spacer employed in the second embodiment.

FIG. 3A shows another embodiment of the magnetic head for magnetooptical recording, of the present invention. In this embodiment, the reinforcing member R is composed of a spacer SP of a non-magnetic material of which the thermal expansion coefficient is close to that of the ceramic material constituting the slider S, and an adhesive material B for fixing said spacer SP in the coil winding groove. The spacer is so formed, as shown in FIG. 3B, as to be fitted into the coil winding groove.

In this embodiment, the spacer SP and the slider S are so selected as to have substantially equal thermal expansion coefficients, in order to avoid stress generation by the temperature change, whereby the mechanical strength of the lower protruding portion of the housing H can be maintained.

In this manner the spacer SP provided around the coil W increases the mechanical strength of the housing portion H in the slider S.

As explained in the foregoing, the object of the present invention is to provide a magnetic head for magnetooptical recording, comprising a non-magnetic reinforcing member inside a coil winding groove provided in the housing portion of the slider in order to improve the mechanical strength of the lower protruding portion of the housing portion, thereby preventing any damage to the lower protruding portion by a shock caused by instantaneous contact of the slider with the disk, at the loading, unloading or seeking operation of the slider.

The above-mentioned object can be attained, according to the present invention, by a floating magnetic head for magnetooptical recording, provided with a magnetic core in a housing portion of a non-magnetic slider, comprising a reinforcing member SP of a non-magnetic material, provided inside a coil winding groove in the housing portion.

Figure 4:
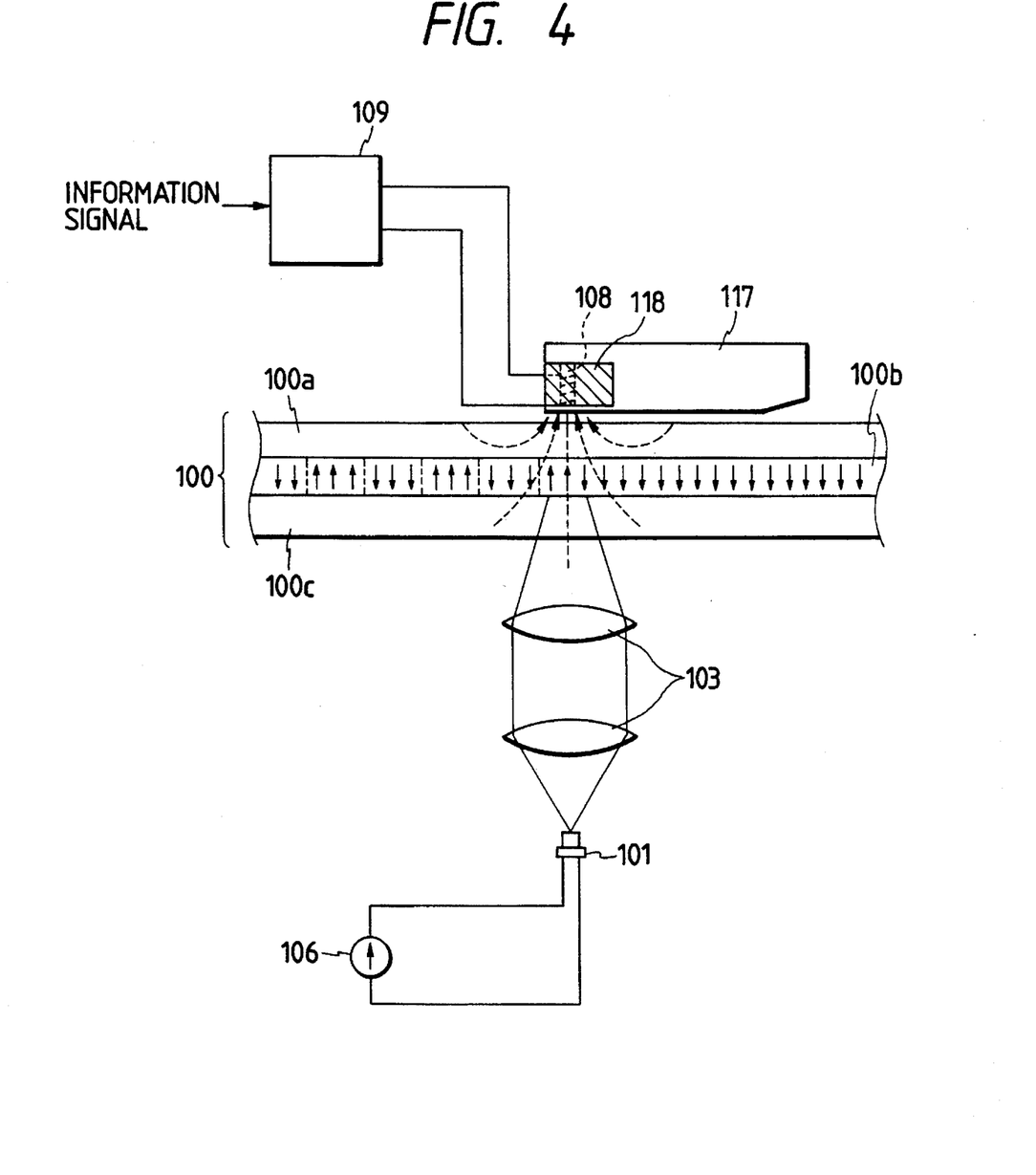
FIG. 4 is a schematic view of a magnetooptical recording apparatus employing the magnetic head for magnetooptical recording of the present invention.

Now reference is made to FIG. 4, for explaining a magnetooptical recording apparatus employing the magnetic head of the present invention.

A laser light source 101 is continuously activated by a DC current supplied by a constant current source 106, and the emitted laser beam is condensed by an optical system 103 onto a magnetic film 100b. A spot irradiated with the laser beam is heated beyond the Curie temperature, whereby the inversion of magnetization is facilitated. On the other hand, a magnetic head 108 is provided on a floating slider 117 and runs in a floating state, with a gap, not exceeding 10 μm, to the surface of a disk 100. In order to avoid damage to the magnetic film 100b by the eventual contact of the floating slider with the disk surface or by the eventual dust involvement, the disk 100 is provided with a special protective film 100a, for example, containing fillers therein, and is therefore superior in durability, to the disk employed in the light modulation method. The magnetic head 108 receives current from a driver circuit 109, whereby the direction of the generated magnetic field is inverted corresponding to the information signal.

A reinforcing member 118 of a non-magnetic material is provided inside a coil winding groove formed in the housing portion of the slider 117.

In the magnetic film 100b, only the portion irradiated by the laser beam is heated and is magnetized in a direction the same as that of the magnetic field generated by the magnetic head 108. The magnetization is conserved by the rapid temperature decrease after leaving the irradiating position of the laser beam, by the rotation of the disk 100. Such magnetic field inversion records the information signal in the magnetic film 100b, by a pattern of magnetized areas of a size comparable to that of the laser beam spot (about 1 μm). In re-writing the recorded information signal, this method dispenses with the erasing operation which once aligns the direction of magnetization, and can achieve direct overwriting by any number of times, by repeating the above-explained operation.

As explained in the foregoing, the magnetic head of the present invention for magnetooptical recording is provided with a reinforcing member composed of a thermosetting resinous material, or a spacer of glass or ceramics, inside a coil winding groove in the housing portion, thereby reinforcing the lower protruding portion which has been deficient in mechanical strength in the conventional configuration, thus avoiding the destruction of the lower protruding portion caused by the shock produced from the eventual contact of the slider with the disk in the loading, unloading or seeking operation of the slider, whereby the reliability of the apparatus can be improved.

Also, the magnetic head for magnetooptical recording, as provided in the present invention, is being recently required to respond to a higher recording speed, and, in order to meet such a requirement, it becomes necessary to reduce the inductance of the magnetic head and to improve the efficiency of the magnetic field generation. As an effective method for attaining such an objective, it has been tried to position the coil W closer to the end of the magnetic pole of the magnetic core C, namely closer to the disk.

Figure 5:
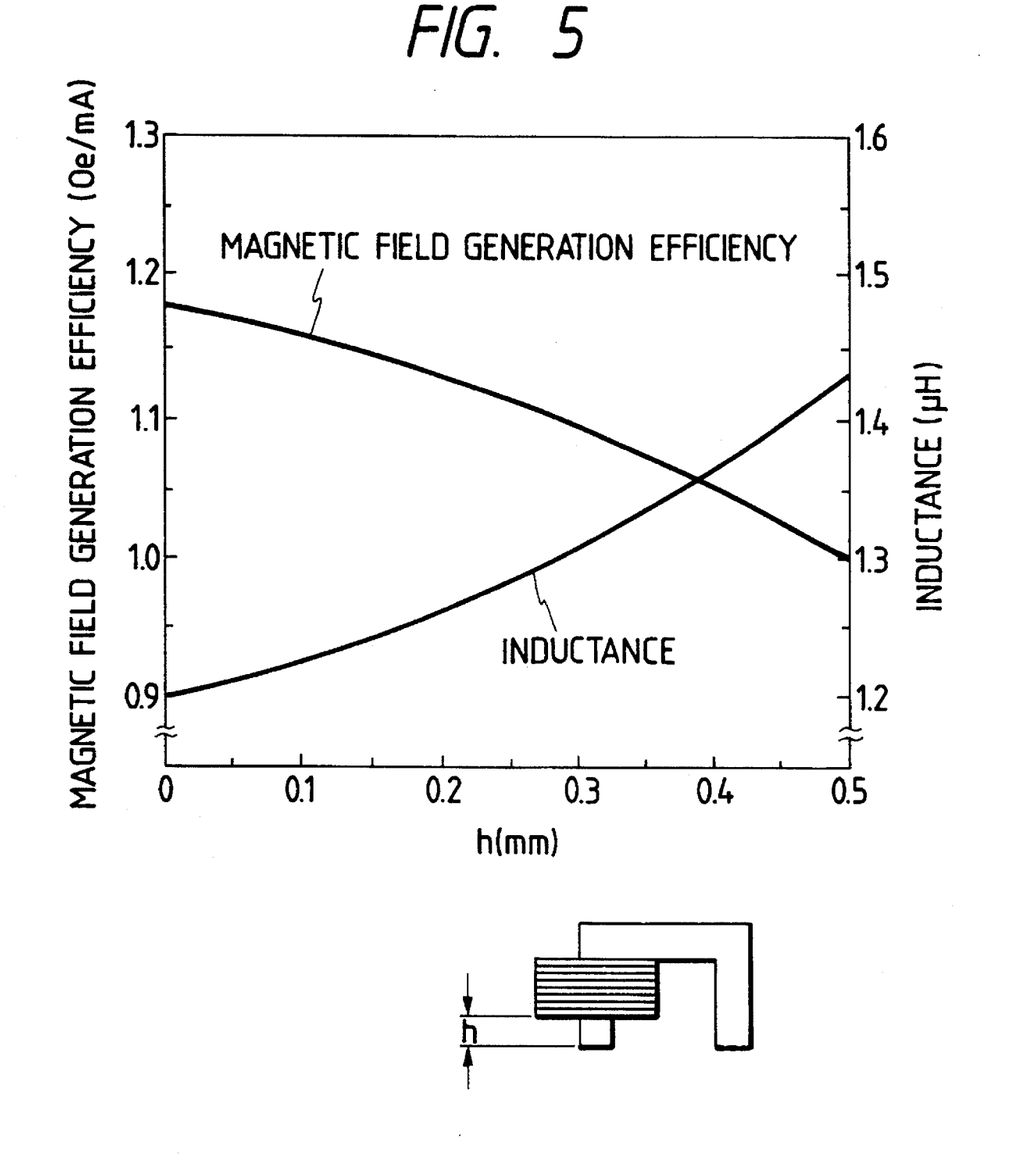
FIG. 5 is a chart showing the relationship among the height from the bottom face of the slider to the coil, the inductance and the efficiency of magnetic field generation.

FIG. 5 is a chart provided for explaining this situation, and representing the experimental relationship among the height h from the bottom face of the slider S to the coil W, the inductance of the magnetic head and the efficiency of the magnetic field generation (magnetic field intensity generated by 1 mA of recording current). As will be apparent from FIG. 5, a smaller height h provides a smaller inductance and a higher efficiency of magnetic field generation, which are suitable for the signal recording of a higher speed.

Because of this reason, the height h from the bottom face of the slider S to the coil W should be made smaller, but said height h is in fact limited by the lower protruding portion of the housing H in the slider S and is comparable to the thickness t of the lower protruding portion. Consequently, the thickness t should be made small, preferably on the order of 0.05 mm. However, if the thickness t is made smaller than about 0.2 mm, the lower protruding portion of the housing H becomes mechanically weak, and may be destructed in the manufacturing process of the magnetic head or by the shock generated in the use of the magnetic head, particularly in the loading, unloading or seeking operation. For this reason the maximum recordable frequency has been about 10 MHz, and a magnetic head capable of meeting the requirements of higher speed recording has not been realized.

In order to resolve the above-mentioned drawback, the present invention provides a method for producing a magnetic head comprising, in the sequential order, a first step of forming a housing portion in a slider of a non-magnetic material; a second step of providing said housing portion with a magnetic core; a third step of winding a coil on said magnetic core; a fourth step of providing the housing portion with a reinforcing member; and a fifth step of machine working the bottom face of the slider, opposed to the disk, so as to obtain a predetermined height to the coil, and a magnetic head produced by said method. The magnetic heads of the present invention, as shown in FIGS. 2 to 3B, can be obtained in the following manner.

In the following there will be given a detailed explanation of the method of the present invention for producing the magnetic head, with reference to FIGS. 6A to 6E.

[1st step]

Figure 6A:
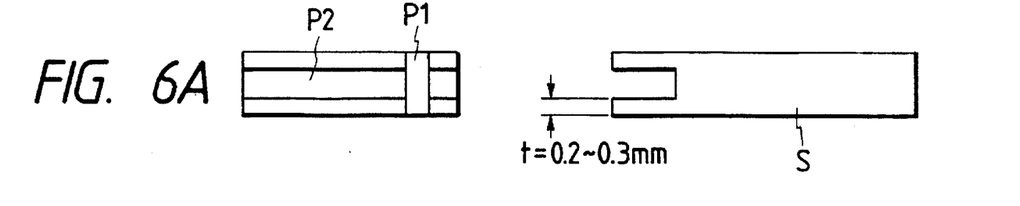
FIGS. 6A to 6E are views showing steps of preparation of the magnetic head for magnetooptical recording of the present invention.

As shown in FIG. 6A, in the rear end of a slider S of a ceramic material, there are formed a groove P1 for accommodating the magnetic core and a groove P2 for a coil winding, constituting the housing portion H. In this embodiment, the housing portion H can be formed by machine working or by press molding. The thickness t of the lower protruding portion of the housing H is selected to be within a range of 0.2 to 0.3 mm, in order to attain a mechanical strength capable of avoiding destruction in the working process.

[2nd step]

Figure 6B:
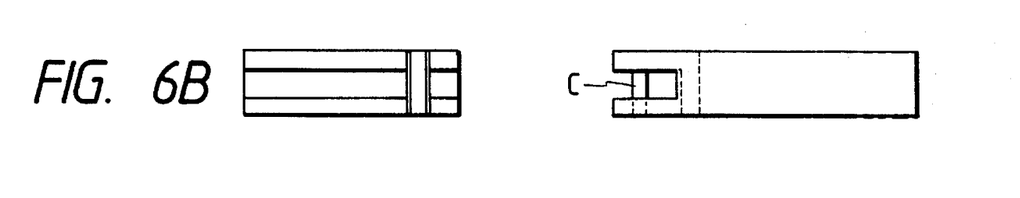

As shown in FIG. 6B, a square C-shaped ferrite magnetic core C is positioned in the magnetic core groove P1 in the housing portion H of the slider S, and is adhered by glass bonding.

[3rd step]

Figure 6C:
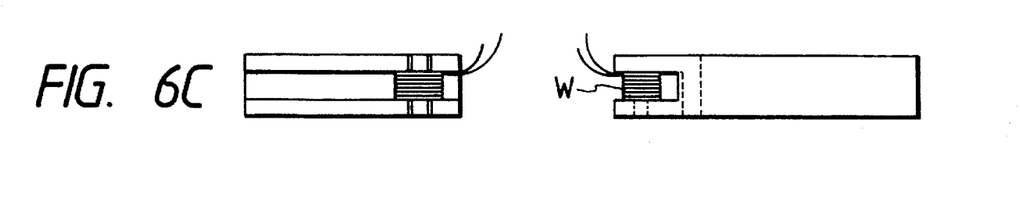

As shown in FIG. 6C, a coil W is wound around the magnetic core C, utilizing the groove P2 provided in the slider S.

[4th step]

Figure 6D:
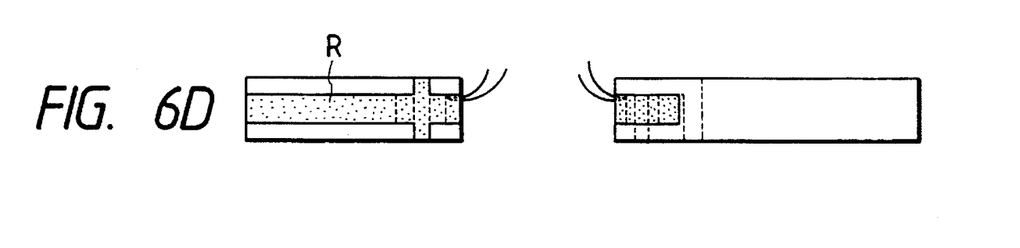

As shown in FIG. 6D, a reinforcing member R is provided in the coil winding groove P2. The reinforcing member R can, for example, be epoxy resin filled in the groove P2, and it is effective to increase the mechanical strength by mixing inorganic filler such as glass or alumina in the resin.

[5th step]

Figure 6E:
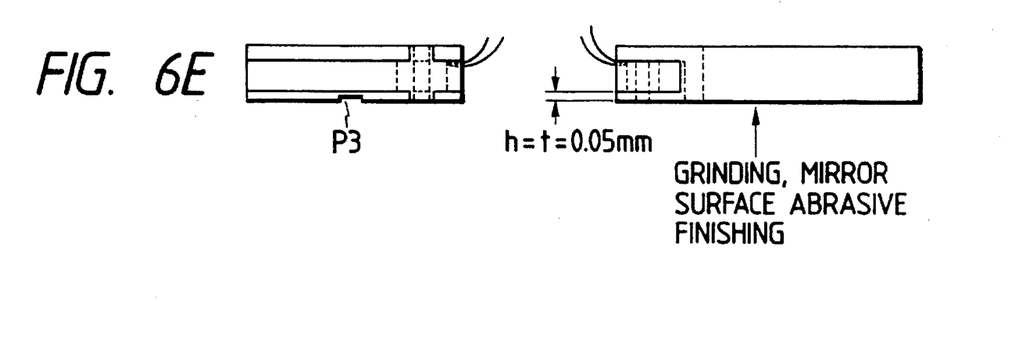

As shown in FIG. 6E, the bottom face of the slider S is shaped by mechanical working such as grinding, in such a manner that the thickness t of the lower protruding portion of the housing H becomes about 0.05 mm, and the bottom face is then mirror finished to a sufficient smoothness and a sufficiently small surface coarseness required for air floating characteristics. The height h from the bottom face of the slider S to the coil. W, being defined by the lower protruding portion of the housing H and comparable to the thickness t thereof, is about 0.05 mm.

Simultaneously with the working on the bottom face of the slider S, there is formed a groove P3 on the bottom face, in order to improve the air floating characteristics of the slider S.

FIG. 2 illustrates the magnetic head, produced according to the above-explained process, in a perspective view.

Also, FIG. 3A shows another embodiment of the magnetic head of the present invention, in which the reinforcing member R is composed of a spacer SP composed of a non-magnetic material such as glass or ceramics of which the thermal expansion coefficient is close to that of the ceramic material constituting the slider S, and an adhesive material B for fixing the spacer SP in the coil winding groove. The spacer SP has a shape, as shown in FIG. 3B, to be fitted in the coil winding groove.

In this embodiment, the spacer SP and the slider S are so selected as to have substantially the same thermal expansion coefficients, thereby avoiding any stress generation caused by the temperature change, and maintaining the mechanical strength of the lower protruding portion of the housing H. Also, the spacer SP, if composed of a material of a high thermal conductivity, can serve as a heat radiating member for effectively dissipating the heat generated when a recording current of a high frequency is supplied to the magnetic head. Such a spacer SP can be composed of a metal such as copper or aluminum, or a ceramic material such as SiC or BN.

As explained in the foregoing, the method of the present invention, for producing a magnetic head, is featured in sequential order by a step of forming a housing portion in a non-magnetic slider; a second step of providing the housing portion with a magnetic core; a third step of winding a coil on said magnetic core; a fourth step of providing the housing portion with a reinforcing member; and a fifth step of mechanically working the bottom face of the slider, opposed to the disk, in such a manner that the height to the coil assumes a predetermined value.

It is therefore rendered possible to avoid the drawback in the prior art of destruction of the lower protruding portion of the housing portion in the slider, when the thickness of the lower protruding portion is made smaller than 0.2 mm in order to reduce the height from the bottom face of said slider to the coil, at the preparation of the housing portion in the manufacture of the magnetic head or by the eventual shock in the use of the magnetic head, particularly in the loading, unloading or seeking operation. It is thus made possible to reduce the height, from the bottom face of the slider to the coil, to be smaller than 0.2 mm, and preferably to 0.05 mm. As a result, there are achieved a smaller inductance of the magnetic head and a higher efficiency of magnetic field generation, thus allowing the use of a maximum recording frequency of 12 to 15 MHz, and realizing high-speed signal recording.

Particularly if the reinforcing member is composed of a spacer of a material of which the thermal expansion coefficient is comparable to that of the slider, the mechanical strength of the housing portion can be more effectively maintained, because of the absence of stress generation by the temperature change. Also, the reinforcing member, if composed of a material of a high thermal conductivity, can serve as a heat radiating member, for effective dissipation of heat, generated when a recording current of a high frequency is supplied to the magnetic head.

What is claimed is:

1. A magnetic head for magnetooptical recording, comprising:

a base comprised of a non-magnetic material;

a groove portion for a coil winding provided on said base;

a protruding portion, comprised by said groove portion and a bottom surface of said base, having a thickness less than 0.2 mm;

a magnetic core, provided within said groove portion, being comprised of a magnetic material;

a coil wound around said magnetic core; and a reinforcing member, provided within said groove member, for reinforcing said base, said reinforcing member being comprised of a non-magnetic material.

2. A magnetic head according to claim 1, wherein said base comprises a slider.

3. A magnetic head according to claim 1, wherein said reinforcing member contains a thermosetting resinous material.

4. A magnetic head according to claim 1, wherein said reinforcing member is substantially equal, in thermal expansion coefficient, to said base.

5. A magnetooptical recording apparatus, comprising:

an optical head for irradiating a magnetooptical recording medium with a light beam;

a magnetic head for applying a magnetic field to the magnetooptical recording medium, said magnetic head comprising (i) a base comprised of a non-magnetic material, (ii) a groove portion for a coil winding, provided on said base, (iii) a protruding portion, comprised by said groove portion and a bottom surface of said base, having a thickness less than 0.2 mm; (iv) a magnetic core, provided within said groove portion, being comprised of a magnetic material, (v) a coil wound around said magnetic core and (vi) a reinforcing member, provided within said groove portion, for reinforcing said base, said reinforcing member being comprised of a non-magnetic material; and driving means for driving said magnetic head.

6. An apparatus according to claim 5, wherein said base comprises a slider.

7. An apparatus according to claim 5, wherein said reinforcing member contains a thermosetting resinous material.

8. An apparatus according to claim 5, wherein said reinforcing member is substantially equal, in thermal expansion coefficient, to said base.

\* \* \* \* \*

UNITED STATES PATENT AND TRADEMARK OFFICE
CERTIFICATE OF CORRECTION

PATENT NO. : 5,523,986           Page 1 of 2
DATED : June 4, 1996
INVENTOR(S) : Kazuyoshi ISHII It is certified that error appears in the above-indentified patent and that said Letters Patent is hereby corrected as shown below:

ON THE COVER PAGE:

In item [56] "References Cited":

Under "U.S. PATENT DOCUMENTS" the following should be inserted:

--4,870,521  9/1989  Okabayashi

FOREIGN PATENT DOCUMENTS 0433021  6/1991  Europe

OTHER PUBLICATIONS

Nakao, et al., "High Speed Overwritable Magneto-Optic Recording," Japanese Jour. App. Phys., Vol. 26, No. 26-4, 1987, pgs. 149 through 154.

Abstract and drawings of Japanese patent document 4-119503, Derwent Database WPI, Section Ch, Week 9222, 4/1992.--.

UNITED STATES PATENT AND TRADEMARK OFFICE
CERTIFICATE OF CORRECTION

PATENT NO. : 5,523,986
DATED : June 4, 1996
INVENTOR(S) : Kazuyoshi ISHII

It is certified that error appears in the above-indentified patent and that said Letters Patent is hereby corrected as shown below:

COLUMN 5:

Line 20, "coil. W," should read --coil W,--.

Signed and Sealed this

Fifth Day of November, 1996

Attest:

BRUCE LEHMAN

Attesting Officer

Commissioner of Patents and Trademarks